April 18, 1944. H. LIEBERHERR 2,346,927
CYLINDER LINER FOR INTERNAL COMBUSTION ENGINES
Filed May 27, 1942
Fig. 1,
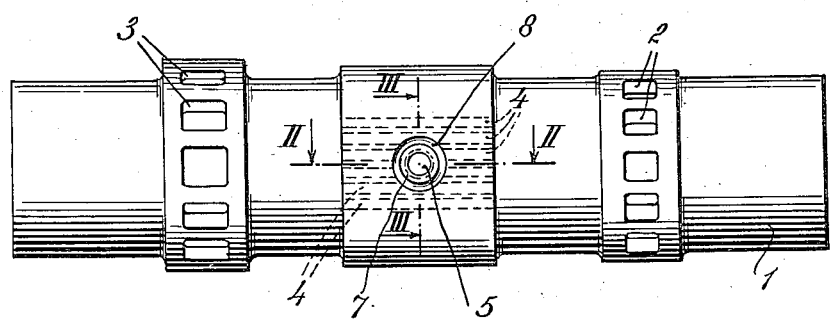
Fig. 2,
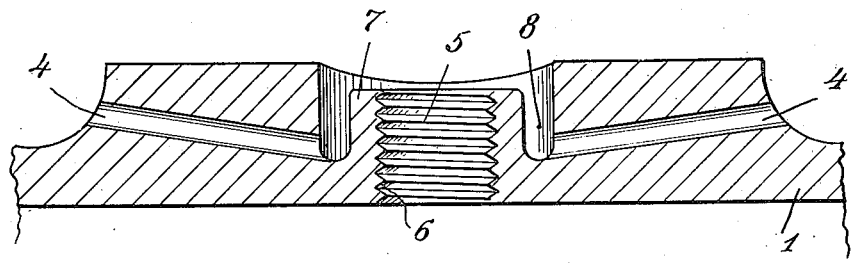
Fig. 3.
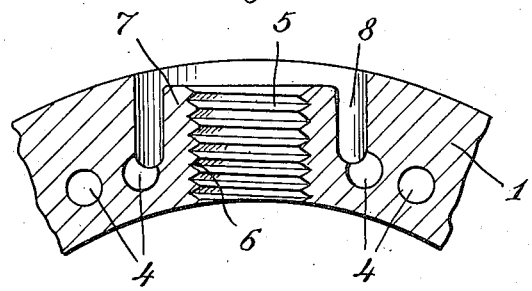
INVENTOR
HANS LIEBERHERR
BY
ATTORNEYS Patented Apr. 18, 1944

2,346,927

UNITED STATES PATENT OFFICE 2,346,927

CYLINDER LINER FOR INTERNAL COMBUSTION ENGINES

Hans Lieberherr, Winterthur, Switzerland, assignor to Sulzer Frères Société Anonyme, Winterthur, Switzerland Application May 27, 1942, Serial No. 444,679
In Switzerland September 20, 1941

4 Claims. (Cl. 123—173)

The invention relates to a cylinder liner for an opposed-piston internal combustion engine which is provided with cooling-passages in the neighbourhood of the combustion space. The invention is characterised in that, around the bores provided for taking the fittings for the combustion space, annular passages are formed into which lead the drilled cooling-passages situated in the neighbourhood of the aforesaid bores. The purpose of the invention is to prevent deformation of the said bores. This not only prevents impermissible stresses arising in these parts of the cylinder liner, but also helps to prevent joints from developing leaks.

The invention is further explained with reference to the drawing.

Fig. 1 shows the cylinder liner of an opposed-piston internal combustion engine according to the invention.

Fig. 2 is a section to a larger scale on the line II—II of Fig. 1 and

Fig. 3 a section to a similar scale on the line III—III of Fig. 1.

The cylinder liner 1 of a two-stroke opposed-piston internal combustion engine has at one end the inlet ports 2 and at the other end the exhaust ports 3. Between these ports, the combustion space is located approximately in the middle of the cylinder liner. In the neighbourhood of this combustion space the cylinder liner walls have cooling-passages 4 through which a cooling-medium is led, in order to prevent too high stresses from occurring at this position in the cylinder liner wall which is most subject to loading from internal pressure and high temperatures. For mounting one of the combustion space fittings, a fuel injection valve for instance, a bore 5 is provided in which a thread 6 is cut.

In order to prevent any deformation, to which the cylinder liner is liable, from being transmitted to the wall parts 7 round the bore 5 for the fitting, an annular groove 8 is formed round the bore, and into it lead the drilled cooling-passages 4 which run in the neighbourhood of the fitting bore 5. After flowing into the annular space 8 from the passages 4, the cooling-water surrounds the part 7, so that the metal round the bore for the fitting, and also the fitting 9 introduced into the bore, do not suffer any deformation or stressing.

Similar bores may also be provided for other combustion space fittings, for instance for the exhaust valve or for indicator cocks, etc.

I claim:

1. A cylinder liner for an opposed-piston internal combustion engine having an opening in the side leading into the combustion space between the pistons, said opening providing a place for mounting a fuel valve or the like, a number of cooling-passages in the wall of the liner, an annular space in the wall of the liner surrounding the opening so formed as to leave a projecting wall of the liner around the opening, at least one of the cooling-passages entering the annular space whereby cooling fluid may circulate through the cooling-passage and in the opening.

2. A cylinder liner for an opposed-piston internal combustion engine having an opening in the side leading into the combustion space between the pistons, said opening providing a place for mounting a fuel valve or the like, a number of cooling-passages in the wall of the liner extending generally in the longitudinal direction of the liner, an annular space in the wall of the liner surrounding the opening, at least one of the cooling-passages entering the annular space whereby cooling fluid may circulate in the cooling-passage and in the annular space.

3. A cylinder liner for an opposed-piston internal combustion engine having an enlarged wall portion between the ends which surrounds the combustion space, an opening in the enlarged portion leading into the combustion space for receiving a fitting such as a valve, a number of small spaced cooling-passages extending through the enlarged portion, an annular space in the enlarged portion of the liner surrounding the opening leaving an annular rim of the liner around the opening, at least one of the cooling-passages entering the annular space whereby a cooling fluid may circulate in the cooling-passage and in the annular space.

4. A cylinder liner according to claim 3 which comprises cooling-passages bored in the enlarged portion at an inclined angle.

HANS LIEBERHERR.